United States Patent [19]

La Bate et al.

[11] 4,096,004

[45] Jun. 20, 1978

[54] REPAIR COMPOSITION FOR STEELMAKING FURNACES AND THE LIKE

[76] Inventors: Michael D. La Bate, 115 Hazen Ave., Ellwood City, Pa. 16117; Erwin F. Franzen, R.D. No. 7, #457, Valparaiso, Ind. 46383

[21] Appl. No.: 706,397

[22] Filed: Jul. 19, 1976

[51] Int. Cl.² .................... C04B 35/04; C06B 45/06; C06B 33/14
[52] U.S. Cl. ........................................ 149/18; 149/41; 106/60; 106/62
[58] Field of Search ............... 106/58, 60, 62; 149/41, 149/18

[56] References Cited

U.S. PATENT DOCUMENTS

| | | | |
|---|---|---|---|
| 3,082,104 | 3/1963 | Belz | 106/62 |
| 3,086,876 | 4/1963 | Griggs et al. | 106/62 |
| 3,172,795 | 3/1965 | Helliwell et al. | 106/62 |
| 3,219,466 | 11/1965 | Isherwood | 106/60 |

*Primary Examiner*—J. Poer
*Attorney, Agent, or Firm*—Webster B. Harpman

[57] ABSTRACT

A refractory lining repair material for steel making furnaces and the like, which consist essentially of an exothermic patching mix which may be either gunned in place or applied to furnace bottoms in the form of briquettes. Also relates to the process of furnace repair employing such mixes.

4 Claims, No Drawings

REPAIR COMPOSITION FOR STEELMAKING FURNACES AND THE LIKE

BACKGROUND OF THE INVENTION

The present invention relates to an exothermic composition for reparing steelmaking furnaces and the like. Such composition may be applied either in the form of a gunning mix or in the form of pitch bonded briquettes. In some respects the present invention represents an improvement over the disclosure by U.S. Pat. No. 3,086,876 "Refractory Composition and Process of Making the Same". However, such material is not adopted for gunning use.

As is well known to those skilled in the art, the refractory linings of steel making vessels and others such as open hearths, electric furnaces, and basic oxygen furnaces, not only are subject to severe erosion during use but also erode unevenly. In order to compensate for and repair such uneven wear and to provide for maximum furnace lining life, the firebrick lining which is normally used in such vessels, is protected in the heavy wear areas by spraying with loose refractory materials containing relatively low temperature bonding composites that causes it to adhere to the brick lining. These composites with the refractory material are usually applied by what is referred to as "gunning" and are presently commercially available in main categories referred to as either silica or phosphate or chromite bonding materials plus lesser known composites. These composites are fluid and thus "wet" the granular refractories when mixed with water.

As is also known to those skilled in the art, practically all large steelmaking vessels use a lining of basic magnesite or magnesite-dolomite brick or the like. To repair such linings, the usual gunning materials, until the advent of this invention, were of a similar basic composition. Such gunning materials are normally of a very fine size.

We have discovered that, by using the gunning mix of the present invention, very desirable furnace repair results are obtained and that by using such combination of materials, furnace lining life has been markedly extended.

We have also discovered that when the present exothermic compositions are applied in the form of pitch bonded briquettes to the floor of steel making furnaces excellent lining repair is accomplished.

Accordingly, a principal object of our invention is to provide a novel exothermic composition for repairing the linings of steel making furnaces and the like.

Another object of our invention is to provide a novel gunning composition for repairing the refractory walls of steelmaking furnaces and the like.

Another object of our invention is to provide a novel composition for repairing the refractory linings of steelmaking furnaces consisting essentially of exothermic patching material in combination with other selected material.

Still a further object of our invention is to provide briquettes of our materials.

Still another object of our invention is to provide a process for repairing refractory linings employing the present novel compositions.

These and other objects, features and advantages of our invention will become apparent to those skilled in this particular art from the following detailed disclosure thereof.

DISCLOSURE OF THE PREFERRED EMBODIMENTS

Compositions, (by weight) which are particularly useful herein consist essentially as follows:
- 50–75% MgO — magnesite
- 8–18% Iron oxide
- 6–16% Aluminum
- 2–10% NaNO$_3$
- 2–10% Bauxite
- 0.5–4% CaF
- 4–8% Coal tar pitch
- 0–10% Sodium borate Within this range particularly a particularly useful composition is:
- 62% MgO — magnesite
- 11% Iron oxide
- 9% Aluminum
- 5% NaNO$_3$
- 3% Bauxite
- 2% CaF
- 5% Coal tar pitch
- 3% Sodium borate Mesh sizes of the constituents hereof preferably range between −50 and −200 mesh for the basic submix and at least −10 mesh for the magnesite.

In the foregoing we note that other complex halides or fluorides may be used in lieu of the calcium fluoride shown above.

To the foregoing when used as a gunning mix is added a modest amount of water, i.e., around 5 per cent by weight, to assist in both fluidizing and enhancing the stickiness of the present materials.

As is well known to those skilled in the art the standard gunning mixes employing silicate or phosphate or chromite bonding mechanisms provide bonds which tend to weaken at high temperature. We have discovered that our novel exothermic gunning mix markedly improves the patching process for refractory furnace lining material and does not suffer the shortcomings of such prior material. Once such mix reaches a temperature of around 1500° F, it ignites and then it is firmly bonded in place by the exothermic reaction which forms an intimate ceramic bond with the firebrick walls.

The present gunning mixes are preferably applied to the side walls of the furnace. Unlike prior art materials we fine that up to 90% thereof adheres to such lateral surfaces upon wet application and upon initiating the exothermic reaction bond quite well thereto.

In another embodiment hereof our exothermic compositions are bonded with pitch and fabricated into briquettes preferably ranging from 1 to 2 inches in their largest dimension. These are used for furnace bottom repair and have especial utility in the repair of bottom blown vessels.

It will be understood that various modifications and variations hereof may be effected without departing from the spirit or scope of our invention.

We claim as our invention:

1. An exothermic repair mix for steel making furnaces and the like consisting essentially of:
   - from 50% to 75% magnesite
   - from 8% to 18% iron oxide
   - from 6% to 16% aluminum
   - from 2% to 10% sodium nitrate
   - from 2% to 10% bauxite
   - from 0.5% to 4% metal halide from 4% to 8% coal tar pitch
from 0 to 10% sodium borate.

2. The mix as defined in claim 1 wherein said metal halide is calcium fluoride.

3. The mix as defined in claim 1 consisting essentially of:
about 62% magnesite
about 11% iron oxide
about 9% aluminum
about 5% sodium nitrate
about 3% bauxite
about 2% calcium fluoride
about 5% coal tar pitch
about 3% sodium borate.

4. The mix of claim 1 wherein the material is in the form of briquettes.

* * * * *